Feb. 9, 1932.  A. O. COBBS  1,844,311
CERTIFICATE HOLDER
Filed March 9, 1931

Inventor
A. O. Cobbs
By M. Talbert Dick
Attorney

Patented Feb. 9, 1932

1,844,311

UNITED STATES PATENT OFFICE

ANSALEM ORVILLE COBBS, OF DES MOINES, IOWA

CERTIFICATE HOLDER

Application filed March 9, 1931. Serial No. 521,348.

The principal object of my invention is to provide a certificate holder for use in automotive vehicles for the displaying of identification cards or certificates that may be quickly and easily attached or detached from the steering column of the vehicle in which it is used.

A further object of my invention is to provide a certificate holder that is capable of having a certificate easily placed in the same or removed from the same.

A still further object of this invention is to provide a certificate holder for holding automobile license certificates, drivers' licenses, or the like, that permits the information being held by the holder to be viewed from a position inside the vehicle to which it is secured as well as from a position outside the seating compartment of the vehicle.

A still further object of my invention is to provide a simple, visible, identification or certificate holder for use in vehicles such as automobiles, trucks, or the like that may be easily installed without in any way damaging the vehicle to which it is attached.

A still further object of my invention is to provide a certificate holder that does not detract from the refined appearance of the seating compartment of the vehicle in which it is placed and one that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Devices for displaying certificates, drivers' licenses and the like are well known to the purchasing public, but these holders are usually of a rigid frame construction and are designed to be secured in and to the seating compartment of the vehicle by bolts, screws, or the like, thereby making them unhandy to install or remove from the vehicle and permanently damaging the vehicle.

Further, certificate holders of this type do not permit the ready placement or removal of the certificates in or from the same. I have overcome such objections by providing a flexible certificate holder of novel construction that may be quickly attached to or detached from the steering column of a vehicle.

Figure 1:
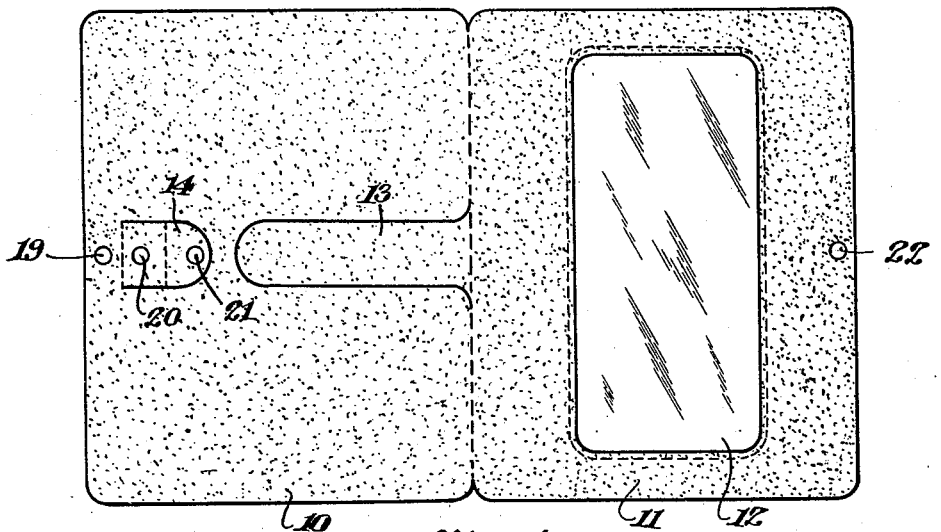
Fig. 1 is a plan view of the flexible base member such as leather, leatherette, or the like that is properly cut and has a transparent sheet attached thereto before the parts are folded and suitably secured together to make up the certificate holder.
Figure 2:
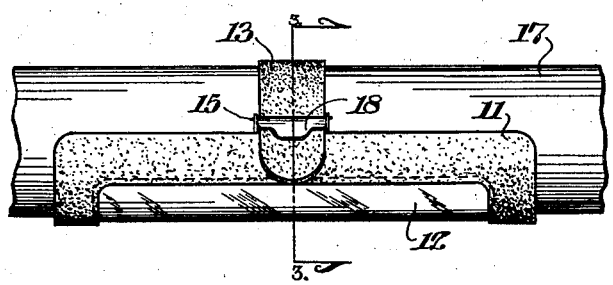
Fig. 2 is a side view of my identification or certificate holder secured to the steering column of a vehicle.
Figures 3, 4:
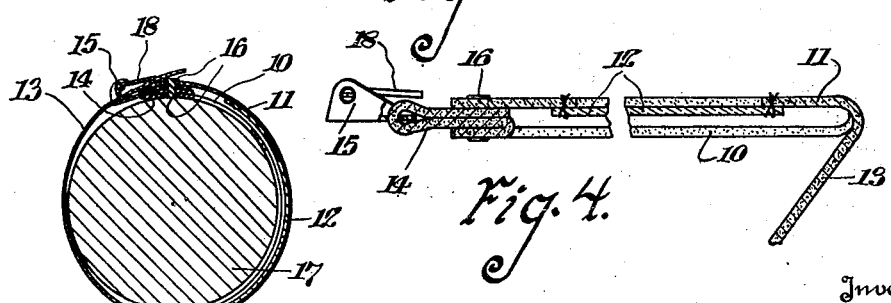
Fig. 3 is a cross sectional view of my invention wrapped around and secured to a steering column or like and is taken on line 3—3 of Fig. 2.
Fig. 4 is a cross sectional view of my holder detached from a steering column and more fully illustrates its construction.

The base portion of my invention is made from a single rectangular sheet of flexible material such as leather, leatherette or the like. This sheet is doubled equally back upon itself to form the back portion 10 of a certificate holder and the front portion 11 of the certificate holder, as shown in Fig. 4. This creates a rectangular design of pleasing and desirable dimensions. In the front portion 11 is an opening which is closed by transparent material 12, such as celluloid, isinglass or the like. This opening which is closed by the transparent material is of elongated rectangular design extending transversely of the longitudinal axis of the elongated sheet of flexible material before the same is folded, as shown in Fig. 1. The transparent material 12 may be secured to the front portion 11 by sewing or other suitable means as desired. By such a construction if a document or certificate is placed between the back portion 10 and the front portion 11, it may be easily seen and read through the transparent sheet 12. The numeral 13 designates a tongue cut out of the central portion of the back portion 10. This tongue 13 extends transversely of the transparent material 12 and has its attached end integral with one of the side marginal edges of the front portion 11.

The numeral 14 designates a similar tongue cut in the central portion of the back 10, but having a length much less than the length of the tongue 13. This tongue 14 is oppositely arranged relative to the tongue 13, in that its secured end is integral with the outer marginal side portion of the back portion 10, as shown in Fig. 1. The numeral 15 designates an ordinary friction catch buckle. This buckle is secured to the tongue 14 by having the tongue looped through its rear portion. The numeral 16 designates a rivet extending first through the back 10, then through the rear portion of the tongue 14, which has been doubled outwardly onto the back portion, then through the free end portion of the tongue after it has passed through the buckle 16, and then through the front portion 11 adjacent that side portion of the back portion 10, as shown in Fig. 4. Holes to accommodate this rivet are first punched in the various portions of the device at the time tongues 14 and 13 are formed, as shown in Fig. 1. The numeral 19 designates the hole or opening in the back 10, while the numeral 20 designates the hole or opening in the rear portion of the tongue 14. The numeral 21 designates the hole or opening in the free end of the tongue 14 and the numeral 22 designates the hole or opening in the portion 11. By the use of this rivet, the outer marginal side edge portions of the back 10 and front 11 will be secured together and the tongue will also be secured thereto in the form of a loop for securing the buckle 15 to that side portion of the back and front portions of the certificate holder. This completes my simple and successful certificate holder and to attach it around a steering column 17 of an automotive vehicle, it is merely necessary to fold the certificate holder partially around the column and then place the tongue 13 the rest of the way around the column, and next insert the end of the tongue into the buckle 15 and lastly, secure the same by manually pressing the clasp 18 of the buckle downwardly. To remove the certificate holder from the steering column it is merely necessary to elevate the clasp catch 18 and withdraw the tongue 13 from the buckle.

In order that the tongue 13 will extend around the column in a direct line with and to the buckle 15, the tongue 14 should be cut in the same plane with the tongue 13, as shown in Fig. 1. By drawing the tongue 13 tightly in the buckle 15, the certificate in the certificate holder will be successfully held without accidental detachment from the certificate holder.

From the foregoing it will readily be seen that I have provided a certificate holder that may be easily attached or detached without damage to the vehicle and one that will not rattle or create noise while the vehicle to which it is secured is in motion.

Some changes may be made in the construction and arrangement of my improved certificate holder without departing from the real spirit and purpose of my invention, and it is my intention to cover by my claims any modified forms of structure or use of mechanical equivalents which may be reasonably included within their scope.

I claim:

1. In a device of the class described, a single elongated strip of flexible material doubled back upon itself near its center to form a back portion and a front portion of the certificate holder; said front side of said holder having an opening, a sheet of transparent flexible material for closing said opening, a tongue portion cut in the said back portion, and a buckle secured to the front portion of said certificate holder, to receive the free end of said tongue.

2. In a device of the class described, a single elongated strip of flexible material doubled back upon itself near its center to form a back portion and a front portion of the certificate holder; said front side of said holder having an opening, a sheet of transparent flexible material for closing said opening, a tongue portion cut in said back portion, a buckle for receiving the free end of said tongue, and a means for securing said buckle and the outer two marginal side portions of said front and back portions to each other.

3. In a device of the class described, a single elongated strip of flexible material doubled back upon itself near its center to form a back portion and a front portion of the certificate holder; said front side of said holder having an opening, a sheet of transparent flexible material for closing said opening, a tongue cut in said back portion having its rear fastened end on a line approximately where said strip is doubled, and a buckle secured to the outer marginal side edge of said front capable of receiving said tongue.

4. In a device of the class described, a single elongated strip of flexible material doubled back upon itself near its center to form a back portion and a front portion of the certificate holder; said front side of said holder having an opening, a sheet of transparent flexible material for closing said opening, a tongue cut in said back portion and extending away from said front portion, a second tongue cut in said back portion, and a buckle secured to said last mentioned tongue and capable of receiving said first mentioned tongue.

5. In a device of the class described, a single elongated strip of flexible material doubled back upon itself near its center to form a back portion and a front portion of the certificate holder, said front side of said holder having an opening, a sheet of transparent flexible material for closing said opening, a tongue cut in said back portion, a second tongue cut in said back portion and of a length much less than the length of said first mentioned tongue, and a buckle secured to said last mentioned tongue and capable of receiving said first mentioned tongue for securing the device to the steering column of the vehicle.

6. In a device of the class described, a single elongated strip of flexible material doubled back upon itself near its center to form a back portion and a front portion of the certificate holder; said front side of said holder having an opening, a sheet of transparent flexible material for closing said opening, a tongue cut in said back portion on lines near the center of said back portion, a second tongue, a buckle on said second tongue for receiving the free end of said first mentioned tongue, and a means for securing the outer side marginal edges of said front and back portions to each other.

7. In a device of the class described, a single elongated strip of flexible material doubled back upon itself near its center to form a back portion and a front portion of the certificate holder; said front side of said holder having an opening, a sheet of transparent flexible material for closing said opening, a tongue cut in said back portion, a second tongue cut in said back portion folded outwardly from between said back portion and front portion and then back again between said back portion and said front portion to form a loop, a rivet extending through said back portion, the first fold of said last mentioned tongue, the free end portion of said tongue and through the marginal side portion of said front portion adjacent thereto, and a buckle secured in the loop portion of said second tongue, for receiving the free end portion of said first mentioned tongue.

8. In a device of the class described, a strip of flexible material adapted to form the back of a certificate holder, a sheet of transparent flexible material over the face of said strip of flexible material, means including said transparent sheet for cooperating with said strip to form a pocket, a tongue cut from said strip of flexible material and extending away from said strip, a second tongue cut in said strip, and a buckle secured to said last mentioned tongue and capable of receiving said first mentioned tongue.

9. In a device of the class described, a single elongated strip of flexible material doubled back upon itself near its center to form a back portion and a front portion of the certificate holder; said front side of said holder having an opening, a sheet of transparent flexible material for closing said opening, a tongue cut in said back portion and extending away from said front portion, a second tongue cut in said back portion, and a means for adjustably securing said two tongues to each other.

ANSALEM ORVILLE COBBS.